United States Patent [19]
Sibigtroth

[11] Patent Number: 5,740,199
[45] Date of Patent: Apr. 14, 1998

[54] HIGH SPEED WIRE-OR COMMUNICATION SYSTEM AND METHOD THEREFOR

[75] Inventor: James M. Sibigtroth, Round Rock, Tex.

[73] Assignee: Motorola Inc., Schaumburg, Ill.

[21] Appl. No.: 527,990

[22] Filed: Sep. 13, 1995

Related U.S. Application Data

[63] Continuation of Ser. No. 216,391, Mar. 23, 1994, abandoned.

[51] Int. Cl.$^6$ .................................................. H03K 7/08
[52] U.S. Cl. ..................... 375/219; 375/238; 375/257; 375/354; 370/280; 370/212; 370/503
[58] Field of Search .......................... 375/257, 7, 36, 375/219, 238, 354; 370/85.1, 103, 280, 212, 503; 395/550; 455/607, 54; 364/200

[56] References Cited

U.S. PATENT DOCUMENTS

| | | |
|---|---|---|
| 4,287,560 | 9/1981 | Forbes et al. ........................ 364/200 |
| 4,374,418 | 2/1983 | Catiller et al. ....................... 364/200 |
| 4,475,208 | 10/1984 | Ricketts ................................. 371/1 |
| 4,500,988 | 2/1985 | Bennett et al. . |
| 4,592,051 | 5/1986 | Frizlen ................................ 370/103 |
| 4,648,132 | 3/1987 | Kawashita ........................... 455/607 |
| 4,799,148 | 1/1989 | Nishioka ............................. 364/200 |
| 4,847,867 | 7/1989 | Nasu et al. ............................ 375/36 |
| 5,022,050 | 6/1991 | Tanaka .................................. 375/7 |
| 5,025,486 | 6/1991 | Klughart ............................. 455/54 |

OTHER PUBLICATIONS

Motorola, Inc.; HC11–M68HC11 Reference Manual; 1989, 1988; pp. 2–9, 2–10, 2–11, 2–27, 2–28, 3–2, and 3–3.

*Primary Examiner*—Dennis M. Butler
*Assistant Examiner*—Majid A. Banankhah
*Attorney, Agent, or Firm*—Bruce E. Hayden

[57] ABSTRACT

A communication system (5) provides an improved wired-OR connection for use in the bidirectional communication of information between two devices. A first device is a master host device (10) which initiates all communications while one or more slave devices (40) connected to a wired-OR common communication line either receive information from or send information to the master device. Depending on a direction of a data transfer operation, either the master or the host determines a bit time required to perform the data transfer. Furthermore, a device which terminates the bit time is the device which issues a speed up pulse for driving the common communication line to a logic one value. Such speed up pulses permit faster communication than is normally possible on a wired-OR communication line and makes high speed bidirectional communication over a single wired-OR line practical.

37 Claims, 4 Drawing Sheets

HIGH SPEED WIRE-OR COMMUNICATION SYSTEM AND METHOD THEREFOR

This application is a continuation of prior application Ser. No. 08/216,391, filed Mar. 23, 1994, now abandoned.

FIELD OF THE INVENTION

This invention relates generally to a data communication system, and more particularly to a data communication system having a wire-or configuration.

BACKGROUND OF THE INVENTION

It is often desirable to connect two or more logic devices for the purpose of communicating information between those devices. Furthermore, it is desirable to minimize the number of pins needed for such communication so that more pins are available for other functions. In a communication system, a three wire system with separate wires for sending information, receiving information, and for a synchronizing clock signal, could provide for high speed communication. However, three wires are still too many wires for some applications. In other communication systems, a single wire system is possible if wired-OR connections are used to prevent harmful conflicts in case more than one driver attempts to drive the connection wire at the same time. In the single wire system, the wired-OR signal is normally passively pulled up to the positive power supply by a simple resistor and each possible driver has an active pull down transistor. However, the speed of such a connection is limited by the rise time of the signal which in turn, is limited by the resistive-capacitive (R-C) time constant of the connecting line.

Different techniques have been developed to attempt to reduce the R-C time constant of the connecting line such that the rise time of the signal is shortened. One such technique exists on the MC68HC11 microcontroller (MCU) available from Motorola, Inc., to speed up rising edges on a wired-OR signal line. The MODA/LIR* pin on the MC68HC11 is a wired-OR connection because the pin is used for two separate functions which might otherwise conflict with each other. During reset initialization, the MODA/LIR* pin is a mode select input to the MCU. When the MCU is operating in a development system, the MODA/LIR* pin is an output that indicates the start of each instruction. The LIR* function remains in its inactive logic high state if the MODA function is a logic zero so the pin can simply be connected to system ground in such a case. The LIR* function is also in its inactive high state while the MCU is being reset so there is no possibility of the LIR* function driving the pin low and confusing the mode selection logic.

An external pullup resistor connected to the MODA/LIR* pin is used to select an expanded mode of operation for the MC68HC11 MCU (the mode select function of the MODA/LIR* pin). This same external pullup resistor provides the passive pullup required by the wired-OR LIR* function. There is also an inherent capacitance associated with the MODA/LIR* pin. This capacitance arises from the layout and wiring of the circuit and cannot be completely eliminated.

Normally, the rise time of a signal on a wired-OR signal is governed by the values of the passive pullup resistor and the unintended capacitance to ground. The LIR* function requires the signal on the MODA/LIR* pin to rise more quickly than this R-C time constant would normally allow. To overcome this problem, the MC68HC11 actively drives the MODA/LIR* pin high for a very brief pulse immediately after the low drive is released at the end of each active-low LIR* event. After this brief high pulse, the MODA/LIR* pin uses the passive pullup resistor to keep the signal at a logic high, as in a traditional wired-OR connection.

SUMMARY OF THE INVENTION

The previously mentioned needs are fulfilled with the present invention. Accordingly, there is provided, in a first form, a communication system. The host logic circuit provides a first host drive signal and a second host drive signal. The first host drive signal drives a communication signal to a first reference value when the first host drive signal is in a first logic state. The second host drive signal drives the communication signal to a second reference value when the second host drive signal is in a second logic state. A target logic circuit is connected to the host logic circuit for communicating the communication signal. The target logic circuit asserts a first target drive signal to indicate to the host logic circuit that the communication signal is a third reference value. The target logic circuit asserts a second target drive signal when the first target drive signal is negated to quickly drive the communication signal to a fourth reference value. The target logic circuit negates the first target drive signal to indicate to the host logic circuit that the communication signal is a fifth reference value. The target logic circuit asserts the second target drive signal after a first predetermined period to quickly drive the communication signal to a sixth reference value.

In a second embodiment of the present invention, a method for communicating data between a host processor and a target processor is provided. The method includes the steps of providing a first host drive signal, driving a communication signal to a first reference value when the first host drive signal is in a first logic state, selectively asserting a second host drive signal when the first host drive signal is in a second logic state and the host processor is writing a data value to the target processor, and selectively driving the communication signal to a second reference value when the second host drive signal is asserted. The method also includes the steps of selectively asserting a first target drive signal when the host processor is reading the data value in a third logic state from the target processor, asserting a second target drive signal when the first target drive signal is negated to quickly drive the communication signal to a third reference value, selectively enabling the first target drive signal to remain negated when the host processor is reading the data value in a fourth logic state, and asserting the second target drive signal after a first predetermined period to quickly drive the communication signal to a fourth reference value.

These and other features, and advantages, will be more clearly understood from the following detailed description taken in conjunction with the accompanying drawings. It is important to note the drawings are not intended to represent the only form of the invention.

DETAILED DESCRIPTION OF A PREFERRED EMBODIMENT

The present invention improves the performance of a wired-OR signal that is used for bidirectional communication of information between two devices. One device is a master host device which initiates all communications while one or more slave devices connected to a wired-OR common communication line either receive information from or send information to the master device.

In this arrangement, all devices are capable of driving the common communication line low at various times during an exchange of information. In particular, when data is transferred from a slave device to the master device, the master device starts each bit time by driving a wired-OR signal low, but the slave device controls a release time of the active-low signal depending upon the data being sent to the master device. Unlike the MODA/LIR* pin of the MC68HC11 MCU, the master device that initiated the active-low drive on the wired-OR signal is not able to determine if any other device is trying to drive the wire-OR signal low when it releases its active-low drive.

A brief active-high signal is still desired to speed up rising edges, but additional information is needed to decide the timing of such speed up pulses and to decide which device should provide these pulses. Care must be taken to avoid conflicts caused by two devices attempting to drive the wired-OR signal to different active voltage levels at the same time.

By carefully controlling the source and timing of brief active-high speed up pulses, the system disclosed in the present invention achieves high speed bidirectional communications over a single wired-OR connection. This reduces the cost of such systems without greatly reducing system performance.

During a following description of the implementation of the invention, the terms "assert" and "negate," and various grammatical forms thereof, are used to avoid confusion when dealing with a mixture of "active high" and "active low" logic signals. "Assert" is used to refer to the rendering of a logic signal or register bit into its active, or logically true, state. "Negate" is used to refer to the rendering of a logic signal or register bit into its inactive, or logically false state.

Description of Connectivity

Figure 1:
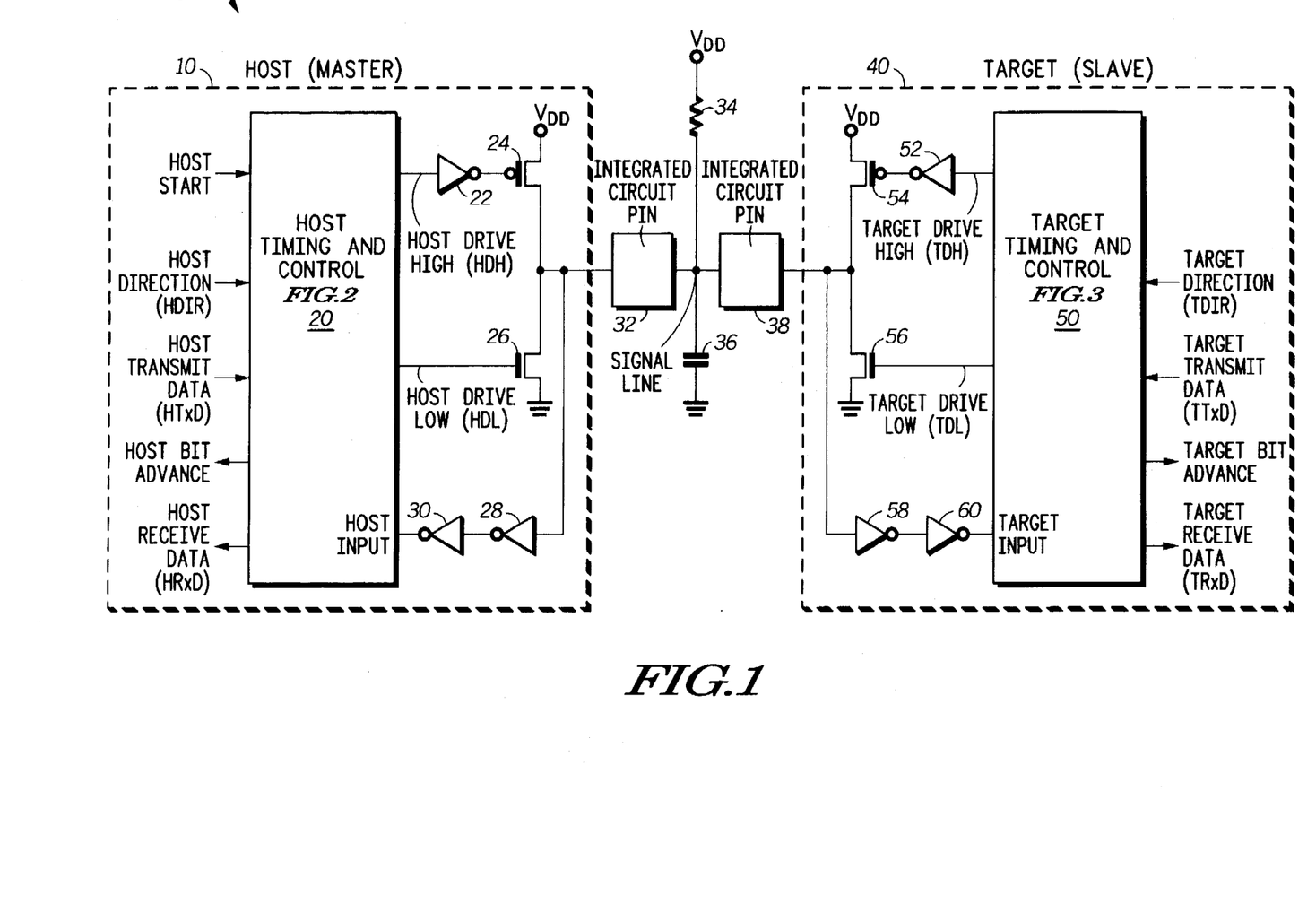
FIG. 1 illustrates in partial block diagram form a wire-or communication system in accordance with the present embodiment of the invention.

FIG. 1 illustrates a communication system 5 which includes a host device 10, an integrated circuit pin 32, a resistor 34, a capacitor 36, an integrated circuit pin 38, and a target device 40. It should be noted that host device 10 is also referred to as a master device. Host device 10 includes a host timing and control circuit 20, an inverter 22, a P-channel active pullup transistor 24, an N-channel low-side driver 26, an inverter 28, and an inverter 30. It should be noted that target device 40 is also referred to as a slave device. Target device 40 includes a target timing and control circuit 50, an inverter 52, a P-channel active pullup transistor 54, an N-channel low-side driver 56, an inverter 58, and an inverter 60.

In FIG. 1, a Host Start signal, a Host Direction (HDIR) signal, and a Host Transmit Data (HTxD) signal are provided to host timing and control circuit 20. A Host Bit Advance and a Host Receive Data (HRxD) signal are provided by host timing and control circuit 20. A Host Drive High (HDH) signal is provided to an input of inverter 22. An output of inverter 22 is coupled to a first electrode of transistor 24. A second electrode of transistor 24 is coupled to a $V_{DD}$ reference voltage and a third electrode of transistor 24 is coupled to a first terminal of integrated circuit pin 32. The third electrode of transistor 24 is also coupled to a first electrode of transistor 26 and an input of inverter 28. A second electrode of transistor 26 is coupled to host timing and control circuit 20 to receive a Host Drive Low (HDL) signal. A third electrode of transistor 26 is coupled to a reference ground voltage. An output of inverter 28 is coupled to an input of inverter 30. An output of inverter 30 is coupled to a host input of host timing and control circuit 20.

A second terminal of integrated circuit pin 32 is coupled to a first terminal of resistor 34, a first terminal of integrated circuit pin 38, and a first electrode of capacitor 36. A second terminal of resistor 34 is coupled to the $V_{DD}$ reference voltage. A second electrode of capacitor 36 is coupled to the reference ground voltage.

A Target Direction (TDIR) signal and a Target Transmit Data (TTxD) signal are provided to target timing and control circuit 50. A Target Bit Advance and a Target Receive Data (TRxD) signal are provided by target timing and control circuit 50. A Target Drive High (TDH) signal is provided to an input of inverter 52. An output of inverter 52 is coupled to a first electrode of transistor 54. A second electrode of transistor 54 is coupled to a $V_{DD}$ reference voltage and a third electrode of transistor 54 is coupled to a second terminal of integrated circuit pin 38. The third electrode of transistor 54 is also coupled to a first electrode of transistor 56 and an input of inverter 58. A second electrode of transistor 56 is coupled to target timing and control circuit 50 to receive a Target Drive Low (TDL) signal. A third electrode of transistor 56 is coupled to a reference ground voltage. An output of inverter 58 is coupled to an input of inverter 60. An output of inverter 60 is coupled to a target input of target timing and control circuit 50.

Figure 2:
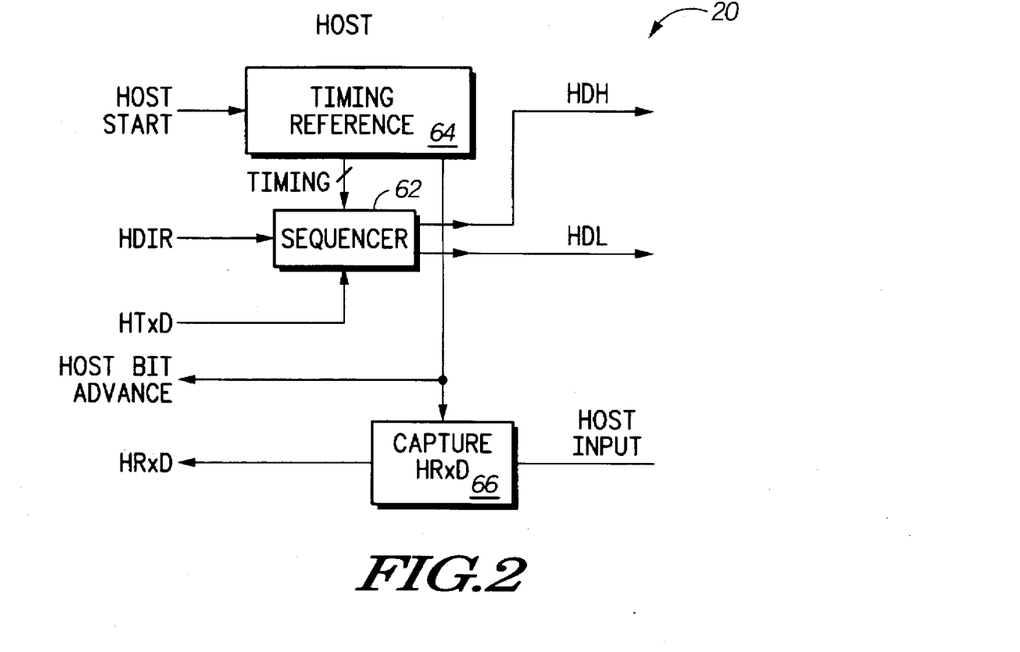
FIG. 2 illustrates in block diagram form a host timing and control circuit of FIG. 1.

A portion of host timing and control circuit 20 is illustrated in greater detail in FIG. 2. FIG. 2 includes a sequencer 62, a timing reference circuit 64, and a capture HRxD register 66. The Host Start signal is provided to timing reference circuit 62. Timing reference circuit 64 provides the Host Bit Advance signal to both capture HRxD register 66 and an external user of host device 10. Timing reference circuit 64 also provides a plurality of Timing signals to sequencer 62. The HDIR and HTxD signals are also provided to sequencer 62. Sequencer 62 provides the HDH and HDL signals. Capture HRxD register 66 provides the HRxD signal in response to the Host Input signal.

Figure 3:
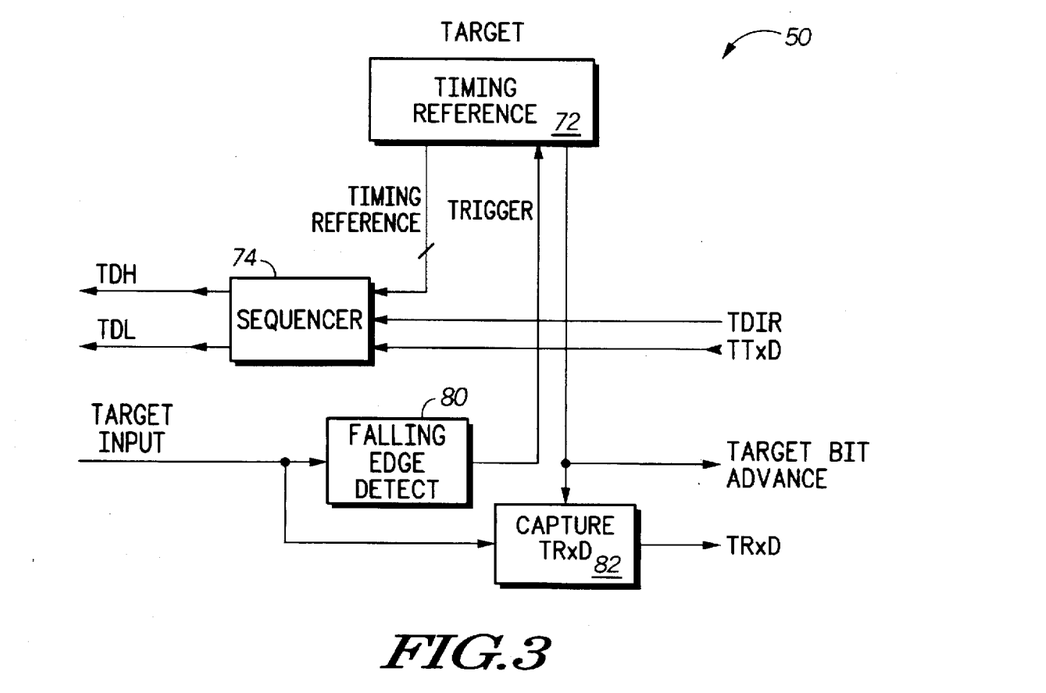
FIG. 3 illustrates in block diagram form a target timing and control circuit of FIG. 1.

A portion of target timing and control circuit 50 is illustrated in greater detail in FIG. 3. FIG. 3 includes a timing reference circuit 72, a sequencer 74, a falling edge detect circuit 80, and a capture TRxD register 82. Timing reference circuit 72 is coupled to sequencer 74 to provide a plurality of Timing Reference signals. Additionally, the TDIR and the TTxD signals are provided to sequencer 74. Sequencer 74 provides the TDH and TDL signals. Timing reference circuit 72 is coupled to falling edge detect circuit 80 to receive a Trigger signal. Timing reference circuit 72 also provides the Target Bit Advance signal to both capture TRxD register 82 and an external user of target device 40. The Target Input signal is provided to falling edge detect circuit 80 and capture TRxD circuit 82. Capture TRxD register 82 provides the TRxD signal in response to the Target Input signal.

Operation of the embodiment of the present invention illustrated in FIG. 1 will subsequently be discussed in more detail.

Description of Operation

In a preferred embodiment of the present invention illustrated in FIG. 1, a single wired-OR pin, 32 and 38 (sometimes referred to as a BKGD pin), is provided on an MCU to provide for background exchange of information between a host development system 10 and a target MCU 40. This background connection allows the host system to examine and change memory locations within the target MCU, program nonvolatile memory such as EPROM or EEPROM, and to control the flow of execution of programs in the target MCU.

Prior to using the wired-OR connection for the exchange of data, communication system 10 is initialized. During initialization, the target device sends an active-low pulse to the host so the host can determine the operating speed of the target device. This allows the devices to communicate without requiring a separate reference clock connection between the host and target devices. The target device is initialized to wait for a command from the host.

All data exchanges are initiated by the host processor. A small set of primitive commands is designed into the host and target devices. For example, if the host wants to read a memory location in the target MCU, the following sequence is followed:

1) The host sends an 8-bit "read memory byte" command to the target;
2) The host sends a 16-bit address of the memory location to be read;
3) The host delays long enough for the target to perform the requested read operation; and
4) The host initiates a read data transfer to read the requested data from the target.

Serial data transfers and command interpreters are well understood in the art so these techniques will not be described in detail here.

FIG. 1 illustrates the wired-OR BKGD signal connecting a pin, 32, of the host processor 10 to a pin, 38, of target device 40. Only the logic directly related to these pins is illustrated in FIG. 1. Though not shown, the host system also includes a complete development system which allows a user or developer to interface to a target device. In this embodiment of the invention, target device 40 which includes pin driver/receiver and control logic, is a complete microcontroller integrated circuit. The BKGD pin, 38, of target device 40 is not used for any normal microcontroller functions so this debug interface does not interfere with any normal microcontroller connections. The connection and application of microcontrollers is well understood in the data processing art and will not be discussed in detail herein.

Host logic 10 includes an N-channel low-side driver 26, a data receive buffer 28 and 30, a P-channel active pullup transistor 24, and timing and control logic 20. Transistor 24 is almost always turned off with only brief active-high drive to speed up rising edges on the wired-OR connection line. Target device 40 includes an N-channel low-side driver 56, a data receive buffer 58 and 60, a P-channel active pullup transistor 54, and timing and control logic 50. Transistor 54 is almost always turned off with only brief active-high drive to speed up rising edges on the wired-OR connection line.

The host and target devices are connected by a wire-OR connection line between a pin 32 of the host and a pin 38 of the target. Resistor 34 is an external pullup resistor for the wired-OR connection line. The minimum resistance for this pullup resistor is limited by the strength of N-channel drivers 26 and 56 and is typically about 1200 ohms. Capacitor 36 is not an actual component, but rather indicates a distributed parasitic capacitance due to the physical wiring of the circuit.

Host timing and control logic 20 is illustrated in greater detail in FIG. 2. All bit times are initiated by the Start signal in the host regardless of whether data is being sent from the host or received by the host. Sequencer 62 generates appropriate HDL and HDH signals depending upon the direction of data transfer (HDIR) and the host transmit data value (HTxD). For example, when the host device sends a logic zero bit to the target device, the HDL signal is driven to its active state for ¾ of a bit time which causes N-channel transistor 26 to actively drive the wired-OR connection line low. After HDL is released, the HDH signal is driven to its active state briefly so that P-channel transistor 24 actively pulls the wired-OR line high. When the host device reads a bit from the target device, the Start signal triggers the start of the timing sequence in the host device. Sequencer 62 drives the HDL signal to its active state for less than ¼ of a bit time as a signal that the bit time has started. At the ½ bit time sample point, timing circuit 64 produces the host bit advance signal which causes a latch 66 to capture the buffered level of the wired-OR connection line. This received data bit (HRxD) is presented to the host system for further processing.

Target timing and control logic 50 is illustrated in greater detail in FIG. 3. The target input signal which is buffered by inverters 58 and 60 drives a falling edge detect logic circuit 80 to produce a trigger signal to timing reference circuit 72. All bit times in the target are initiated by the trigger signal. Sequencer 74 generates appropriate TDL and TDH signals depending upon the direction of data transfer (TDIR) and the target transmit data value (TTxD). For example, when the target device sends a logic zero bit to the host, the host device drives its HDL signal to its active state for ¼ of a bit time or less which causes N-channel transistor 26 to actively drive the wired-OR communication line low. The falling edge on the wired-OR communication line is detected by falling edge detect logic 80 to trigger the start of a bit time in the target device. Sequencer 74 drives the TDL signal to its active state for ¾ of a bit time which causes N-channel transistor 56 to actively drive the wired-OR connection line low. After TDL is released, the TDH signal is driven to its active state briefly so that P-channel transistor 54 actively pulls the wired-OR line high.

When the host device sends a bit to the target device, the falling edge on the wired-OR communication line (which was caused by the host driving the line low), triggers the start of a bit time in the target device. At the ½ bit time sample point, timing circuit 72 produces the target bit advance signal which causes a latch 82 to capture the buffered level of the wired-OR connection line. This received data bit (TRxD) is presented to the target system for further processing. The timing of the communication between the host device and the target device will be discussed in further detail.

Timing Diagrams

The bit level protocol on the wired-OR communication line is made up of fixed length bit times with arbitrary delay times between adjacent bits. Each bit time is started by the host driving an active low level on the wired-OR signal line. The target device recognizes this falling edge as the start of a bit time. The host and target devices independently time the duration of each bit time (implied synchronization). The logic sense of each bit time is sampled at about ½ of a bit time after the start of the bit time and the delay between bits is not important since each new bit can be recognized by the falling edge on the wired-OR line. The wired-OR signal must be at a valid logic high between successive bits, for long enough to allow recognition of a new falling edge.

FIGS. 4 through 7 illustrate timing details for the four possible cases of data value and direction of transfer between the host and target devices. The timing reference scale illustrated by the tick marks at the top of each of FIGS. 4 through 7 is marked off in target system clock cycles. The host system has a similar timing reference which is not synchronized to the target system clock and may be a completely different speed. Although the host is operating from a completely different clock reference, the host is aware of the speed of the target and produces signals that can be measured in target system clock cycles. A falling edge on the common wired-OR communication line provides a common reference point for timing each bit time. Except for a part of a target system clock cycle for the target system to detect this falling edge, the host and target can be thought of as measuring the bit time from the same point in time.

Figure 4:
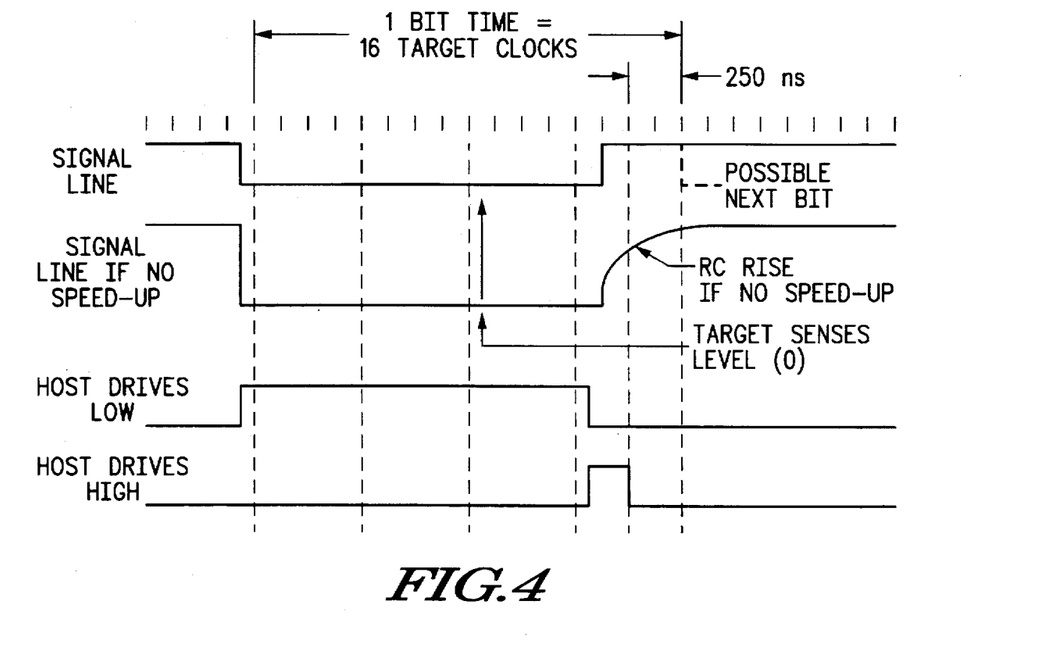
FIG. 4 illustrates in timing diagram form a first communication operation in which a host processor writes a data value having a logic zero value to a target processor in accordance with a present embodiment of the invention.

The timing diagram in FIG. 4 illustrates the host device sending a logic zero bit to the target device. In FIG. 4, a top trace illustrates the wired-OR signal line. A second trace illustrates what the signal line would look like without the benefit of the speed up mechanism described in this embodiment of the invention. A third trace illustrates the HDL signal which drives N-channel driver transistor 26. When the HDL signal is high, N-channel driver 26 actively drives the wired-OR communication line to a logic low level. A fourth trace illustrates the HDH signal which drives the P-channel pullup device 24. When the HDH signal is high, P-channel device 24 actively drives the wired-OR communication line to a logic high level to overcome capacitance 36 quickly. After the falling edge on HDH, when neither HDH nor HDL are high, the wired-OR line is not driven and is held high by external passive pullup resistor 34 (as in a normal wired-OR signal). An arrow in the middle of FIG. 4 illustrates where the target device samples the logic level of the bit time (in this case a logic zero).

Notice where a new bit time can begin as shown at the right end of the top trace. In order for the target's falling edge detect logic 80 to recognize this falling edge, the signal line must be at a valid logic high state for a short time prior to this falling edge. In the case of a signal line that does not have the speed up feature, the R-C time constant interferes with the rapid rise of the signal line and could interfere with proper detection of a subsequent falling edge. To be safe, a longer time would need to be allowed between successive bits to allow the wired-OR signal to rise to a good logic high level between bits. This would slow down communications.

Figure 5:
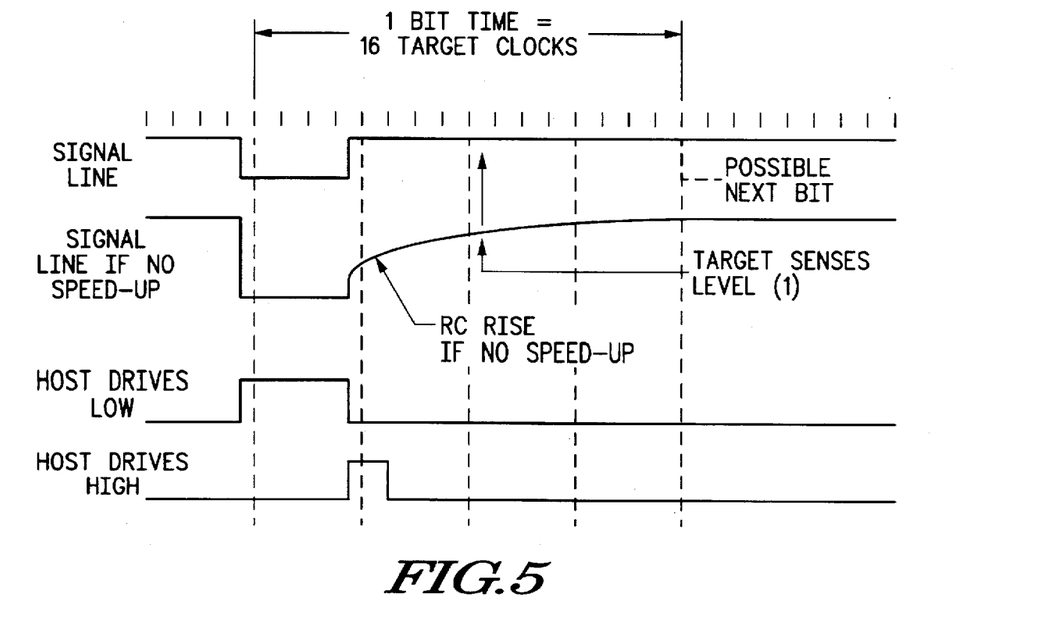
FIG. 5 illustrates in timing diagram form a second communication operation in which the host processor writes a data value having a logic one value to the target processor in accordance with the present embodiment of the invention.

The timing diagram in FIG. 5 illustrates the host device sending a logic one bit to the target device. A top trace illustrates the wired-OR signal line. A second trace illustrates what the signal line would look like without the benefit of the speed up mechanism. A third trace illustrates the HDL signal which drives N-channel driver transistor 26. When the HDL signal is high, N-channel driver 26 actively drives the wired-OR communication line to a logic low level. A fourth trace illustrates the HDH signal which drives the P-channel pullup device 24. When the HDH signal is high, P-channel device 24 actively drives the wired-OR communication line to a logic high level to overcome capacitance 36 quickly. After the falling edge on HDH, when neither HDH nor HDL are high, the wired-OR line is not driven and is held high by external passive pullup resistor 34 (as in a normal wired-OR signal). An arrow in the middle of FIG. 5 illustrates where the target device samples the logic level of the bit time (in this case a logic one).

Notice where a bit time is sampled compared to the R-C rise time on the signal line. Without the benefit of the speed up mechanism, there is a risk that the signal line may not have reached a valid logic high value by the time it is sampled. The speed up mechanism allows closer spacing between the low drive release at ¼ bit time to the sample at ½ bit time. The present embodiment of the invention allows faster data communications than in a system without speed up.

Figure 6:
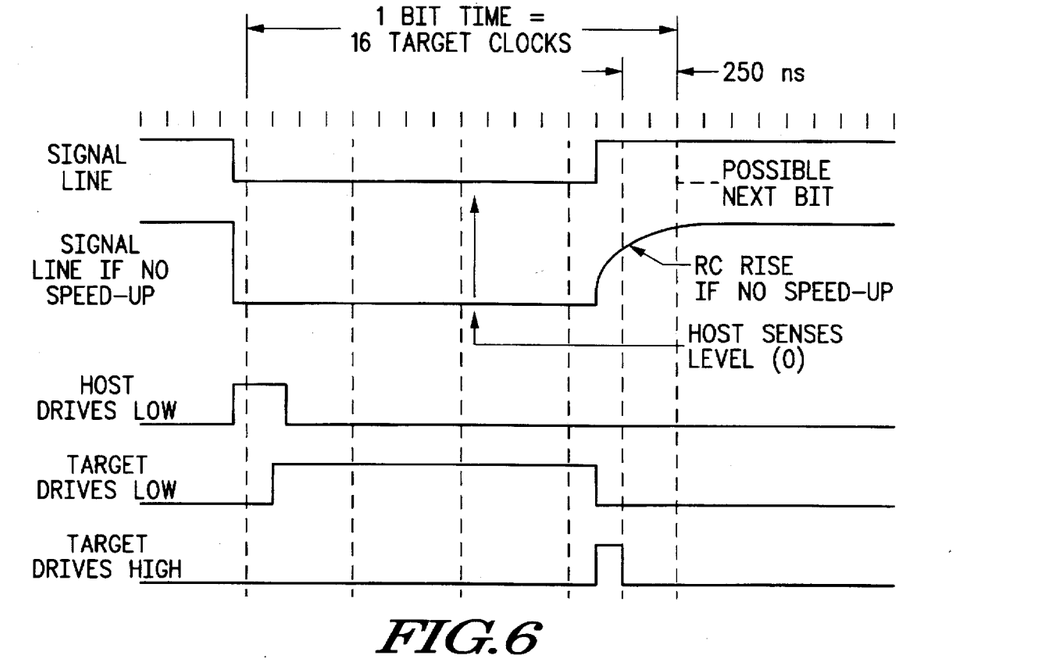
FIG. 6 illustrates in timing diagram form a third communication operation in which the host processor reads a data value having a logic zero value from the target processor in accordance with the present embodiment of the invention.

The timing diagram in FIG. 6 illustrates the host device reading a logic zero bit from the target device. A top trace illustrates the wired-OR signal line. A second trace illustrates what the signal line would look like without the benefit of the speed up mechanism. A third trace illustrates the HDL signal which drives N-channel driver transistor 26. When the HDL signal is high, N-channel driver 26 actively drives the wired-OR communication line to a logic low level. A fourth trace illustrates the TDL signal which drives the N-channel driver transistor 56. When the TDL signal is high, N-channel driver 56 actively drives the wired-OR communication line to a logic low level. A fifth trace illustrates the TDH signal which drives the P-channel pullup device 54. When the TDH signal is high, P-channel device 54 actively drives the wired-OR communication line to a logic high level to overcome capacitance 36 quickly. When no devices are driving the wired-OR communication line, the wired-OR line is not driven and is pulled high by external passive pullup resistor 34 (as in a normal wired-OR signal). An arrow in the middle of FIG. 6 illustrates where the host device samples the logic level of the bit time (in this case a logic zero).

Notice the overlap of HDL and TDL signals near the start of the bit time. This indicates a period where both N-channel transistors 26 and 56 are driving the wired-OR signal line low at the same time. Since both drivers are driving the signal line to the same voltage level, there is no conflict. If the speed up mechanism was not present, the R-C rise time on the wired-OR line would limit the spacing between the release of the low drive and the start of a new bit time. A longer delay would be needed between successive bits to assure proper detecting of the next failing edge on the wired-OR line.

Figure 7:
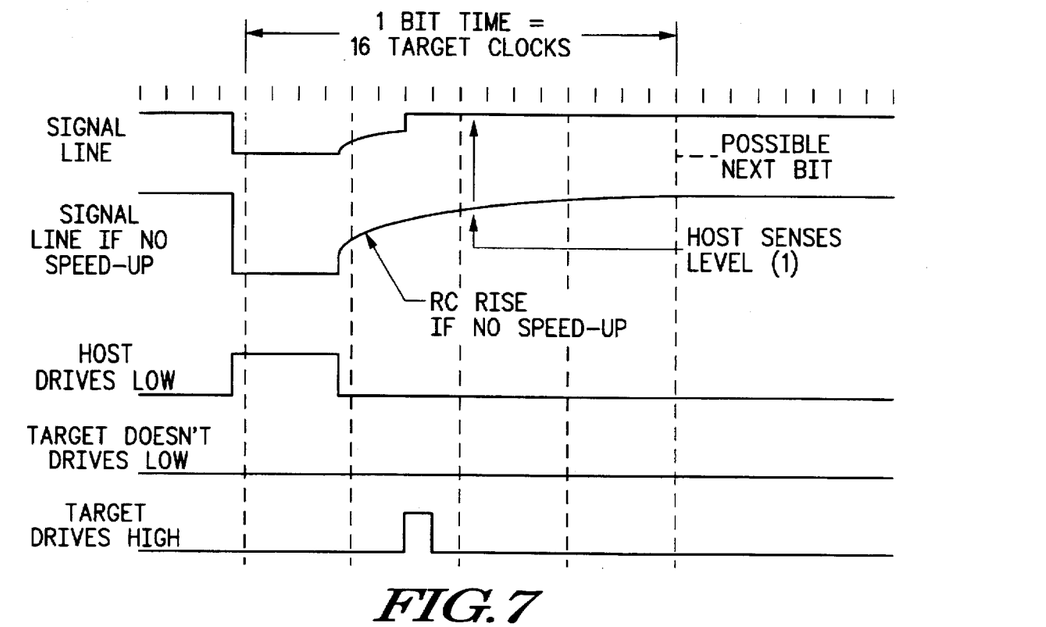
FIG. 7 illustrates in timing diagram form a fourth communication operation in which the host processor writes a data value having a logic one value from the target processor in accordance with a present embodiment of the invention.

The timing diagram in FIG. 7 illustrates the host reading a logic one bit from the target. A top trace illustrates the wired-OR signal line. A second trace illustrates what the signal line would look like without the benefit of the speed up mechanism. A third trace illustrates the HDL signal which drives N-channel driver transistor 26. When the HDL signal is high, N-channel driver 26 actively drives the wired-OR communication line to a logic low level. A fourth trace illustrates the TDL signal which would drive the N-channel driver transistor 56, but the TDL signal is not driven to its active state during a logic one bit time. A fifth trace illustrates the TDH signal which drives the P-channel pullup device 54. When the TDH signal is high, P-channel device 54 actively drives the wired-OR communication line to a logic high level to overcome capacitance 36 quickly. When no devices are driving the wired-OR communication line, the wired-OR line is not driven and is pulled high by external passive pullup resistor 34 (as in a normal wired-OR signal). An arrow in the middle of FIG. 6 illustrates where the host device samples the logic level of the bit time (in this case a logic zero).

Notice that the host system is controlling the active-low drive on the wired-OR signal line, but the target is controlling the active-high speed up pulse. The target device must wait long enough to be sure the host is no longer actively driving the wired-OR signal line low to avoid a potentially harmful conflict between transistors 26 and 54. The target device must drive the active speed up pulse before the host samples the level on the wired-OR line. The top trace illustrates the signal line driven actively to zero during the first ¼ of the bit time. The signal line then illustrates a characteristic R-C rise for about ⅛ of a bit time. During this time the wired-OR line is not driven and the rise time is governed by resistor 34 and capacitance 36. Next, the signal line rises rapidly to the high level due to the speed up pulse on the TDH signal.

In summary, the present invention provides a system and method for speeding up the rising edges of a wired-OR signal by providing an active-high pulse after removing each active-low drive signal. When there is only one driver this is a simple matter of the driving device supplying the brief active-high pulse after it releases each active-low drive signal. When there are more possible drivers, the source and timing of the active-high speed up pulse is more difficult. A system has been described where a master device initiates all data transfers and the device which controls the completion of the bit time is determined by the direction of data transfer. The device which terminates the bit time is the device which will issue the speed up pulse. Speed up pulses permit faster communication than is normally possible on a wired-OR communication line. This makes high speed bidirectional communication over a single wired-OR line practical.

As well, the present embodiment of the invention is especially useful in development systems requiring a background mode of operation. In the preferred embodiment, a single bidirectional communication line is used to exchange debugging commands and information between a host development system and a target MCU. In most microcontroller applications, keeping the cost of the target application system low is very important. Since debug features do not add directly to the value of an end product, they must be kept to an absolute minimum. In a typical microcontroller system, debug functions are shared with some other normal functions to avoid the added cost and wiring for additional dedicated pins. This causes engineering challenges to avoid interference between debug operations and normal functions. In the preferred embodiment, the integrated circuit pin 32 of host device 10 could be implemented as a background debug pin which is dedicated to debug functions so there is no interference with normal functions. Prior to this invention, the speed of communication over a wired-OR connection was not fast enough for microcontroller debugging operations.

The implementation of the invention described herein is provided by way of example only. However, many other implementations may exist for executing the function described herein. For example, this invention is also applicable in any system where efficient bidirectional communication over a single wire is desirable. Many applications that currently use the SPI interface of the MC68HC11 microcontroller could benefit from a microcontroller with this communication technique because this system uses fewer wires than the SPI system. Furthermore, in this embodiment of the invention, the reference clocks in the host and target were independent, but the overall system could operate faster if both systems shared a common clock reference and, therefore, eliminated synchronization delays and allowance for differences in clock speed. Additionally, timing reference blocks 64 and 72 are based on counters and a clock reference, but in an alternate embodiment these timing reference blocks could be based on R-C delays or gate propagation delays or other timing techniques known in the art.

While there have been described herein the principles of the invention, it is to be clearly understood to those skilled in the art that this description is made only by way of example and not as a limitation to the scope of the invention. Accordingly, it is intended, by the appended claims, to cover all modifications of the invention which fall within the true spirit and scope of the invention.

I claim:

1. A data processing system, comprising:
   a single wired-OR communication wire for bidirectionally communicating both data and timing information;
   host logic means coupled to the single wired-OR communication wire for providing a first host drive signal to enable the single wired-OR communication wire to communicate a first logic value and for providing a second host drive signal to enable the single wired-OR communication wire to communicate a second logic value; and
   target logic means coupled to the single wired-OR communication wire for detecting a first timing value transferred by the single wired-OR communication wire, the target logic means selectively providing a first target drive signal in response to the first timing value to enable the single wired-OR communication wire to communicate a third logic value, the target logic means selectively providing a second target drive signal in response to the first timing value to enable the single wired-OR communication wire to communicate a fourth logic value.

2. The data processing system of claim 1 further comprising:
   first input means for providing a host direction signal to indicate when the host logic means is writing a data information value to the target logic means.

3. The data processing system of claim 2 wherein the host logic means provides the first host drive signal in an active state for a first period of time when the host direction signal indicates the host logic means is writing the data information value to the target logic means.

4. The data processing system of claim 3 wherein the first host logic means enables the signal wired-OR communications wire to communicate the first logic value when the first host drive signal is in the active state.

5. The data processing system of claim 3 wherein the host logic means provides the second host drive signal in the active state for a second period of time, the second period of time being sequential to, but not overlapping, the first period of time.

6. The data processing system of claim 5 wherein the second host logic means enables the single wired-OR communications wire to communicate the second logic value when the second host drive signal is in the active state.

7. The data processing system of claim 5 wherein the first period of time and the second period of time are equal to or less than a single bus timing cycle of the data processing system.

8. The data processing system of claim 2 wherein the target logic means further comprises:

a latch circuit for storing the data information value after the first timing value is transferred by the single wired-OR communications wire and when a target bit advance signal is asserted.

9. The data processing system of claim 8 wherein the target logic means asserts the target bit advance signal a third period of time after the first timing value is received.

10. The data processing system of claim 1 further comprising:

second input means for providing a target direction signal to indicate when the target logic means is writing a data information value to the host logic means.

11. The data processing system of claim 10 wherein the target logic means provides the first target drive signal in an active state for a third period of time when the first timing value is received by the target logic means and the target direction signal indicates the target logic means is writing the data information value to the host logic means and when the first timing value.

12. The data processing system of claim 11 wherein the first target drive signal enables the single wired-OR communications wire to communicate the third logic value when the first target drive signal is in the active state.

13. The data processing system of claim 12 wherein the target logic means provides the second target drive signal in the active state for a fourth period of time, the fourth period of time being sequential to, but not overlapping, the third period of time.

14. The data processing system of claim 13 wherein the second target drive signal enables the single wired-OR communications wire to communicate the fourth logic value when the second target drive signal is in the active state.

15. The data processing system of claim 13 wherein the third period of time and the fourth period of time are equal to or less than a single bus timing cycle of the data processing system.

16. The data processing system of claim 1 wherein the first timing value is a transition of a signal transferred via the single wire-OR communications wire from a first reference level to a second reference level.

17. A method for communicating data between a host data processor and a target data processor, comprising the steps of:

providing a single wired-OR communication wire for bidirectionally communicating both data and timing information;

selectively enabling the host data processor to provide a first host drive signal to enable the single wired-OR communication wire to communicate a first logic value;

selectively enabling the host data processor to provide a second host drive signal to enable the single wired-OR communication wire to communicate a second logic value;

enabling the target data processor to detect a first timing value transferred by the single wired-OR communication wire;

enabling a target data processor to selectively provide a first target drive signal in response to the first timing value to enable the single wired-OR communication wire to communicate a third logic value; and enabling a target data processor to selectively provide a second target drive signal in response to the first timing value to enable the single wired-OR communication wire to communicate a fourth logic value.

18. The method of claim 17 further comprising the step of:

generating the first timing value when a signal transferred via the single wired-OR communication wire transitions from a first reference level to a second reference level.

19. The method of claim 17 further comprising the step of:

receiving a host direction signal to indicate when the host data processor is writing a data information value to the target data processor.

20. The method of claim 19 wherein the host data processor provides the first host drive signal in an active state for a first period of time when the host direction signal indicates the host data processor is writing the data information value to the target data processor.

21. The method of claim 20 wherein the first host drive signal enables the single wired-OR communication wire to communicate the first logic value when the first host drive signal is in the active state.

22. The method of claim 21 wherein the host data processor provides the second host drive signal in the active state for a second period of time, the second period of time being sequential to, but not overlapping, the first period of time.

23. The method of claim 22 wherein the second host drive signal enables the single wired-OR communication wire to communicate the second logic value when the second host drive signal is in the active state.

24. The method of claim 23 wherein the first period of time and the second period of time are equal to or less than a single bus timing cycle of the data processing system.

25. The method of claim 17 further comprising the step of:

storing the data information value after the first timing value is transferred by the signal wired-OR communication wire and when a target bit advance signal is asserted.

26. The method of claim 25 further comprising the step of:

asserting the target bit advance signal a third period of time after the first timing value is received.

27. The method of claim 17 further comprising the step of:

providing a target direction signal to indicate when the target data processor is writing a data information value to the host data processor.

28. The method of claim 27 further comprising the step of:

enabling the target data processor to provide the first target drive signal in an active state for a third period of time when the first timing value is received by the target data processor and the target direction signal indicates the target data processor is writing the data information value to the host data processor and when the first timing value.

29. The method of claim 26 wherein the first target drive signal enables the single wired-OR communication wire to communicate the third logic value when the first target drive signal is in the active state.

30. The method of claim 29 wherein the target data processor provides the second target drive signal in the active state for a fourth period of time, the fourth period of time being sequential to, but not overlapping, the third period of time.

31. The method of claim 30 wherein the second target drive signal enables the single wired-OR communication wire to communicate the fourth logic value when the second target drive signal is in the active state.

32. The method of claim 30 wherein the third period of time and the fourth period of time are equal to or less than a single bus timing cycle of the data processing system.

33. The data processing system of claim 1 wherein data and timing information is communicated in a varying and non-periodic manner.

34. A data processing system, comprising
   a single wired-OR communication connection for bidirectionally communicating both data and timing information;
   host logic means coupled to the single wired-OR communication wire for:
      providing a first timing value by driving the single wired-OR communication connection to a first reference level, and
      determining whether the single wired-OR communication connection is at a second reference level or at a third reference level at a host data sampling time; and
   target logic means coupled to the single wired-OR communication connection for:
      detecting the first timing value, and
      in response to the first timing value selectively providing either:
         a first target drive signal prior to the host data sampling time to drive the single wired-OR communication connection to a fourth reference level to communicate a first logical value to the host logic means, or
         a second target drive signal after the host data sampling time to drive the single wired-OR communication connection to the fourth reference level to communicate a second logical value to the host logic means.

35. The data processing system in claim 34 wherein:
   the first reference level is the second reference level, and
   the third reference level is the fourth reference level.

36. The data processing system in claim 34 wherein:
   the first logical value is a zero (0), and
   the second logical value is a one (1).

37. The data processing system in claim 34 wherein:
   the first reference level and the second reference level are low, and
   the third reference level and the fourth reference level are high.

\* \* \* \* \*